May 9, 1933.                J. L. COX ET AL                1,908,120

PROCESS OF MAKING WINDSHIELDS FOR PROJECTILES

Filed Oct. 11, 1930

INVENTORS
John L. Cox &
Bernard M. Fine
ATTORNEYS.

Patented May 9, 1933

1,908,120

UNITED STATES PATENT OFFICE

JOHN L. COX AND BERNARD M. FINE, OF PHILADELPHIA, PENNSYLVANIA

PROCESS OF MAKING WINDSHIELDS FOR PROJECTILES

Application filed October 11, 1930. Serial No. 488,036.

This invention relates to windshields for projectiles.

It is customary to provide projectiles with windshields for the purpose of minimizing wind resistance to the flight of the shell. It is usually required that such windshields be removably secured to the projectiles. This is desirably accomplished by threading the rear end of the windshield direct onto the projectile body (in target projectiles) or direct onto the cap which, in service projectiles, covers the point of the projectile body. Windshields provided with an internal screw thread at their rear ends are necessarily of sufficient thickness to allow the screw thread to be formed therein without substantially weakening the windshield at its rear end. Such thickness is much greater than is desirable for a windshield.

One way of solving the problem is to provide a windshield of drawn steel of the desired small thickness and secure within the rear end thereof a ring, the screw thread being formed on the ring.

It may be, however, desired or required to have the internal screw threads cut into the body of the windshield so as to be integral therewith, while still providing a windshield comparable in lightness with the windshield of drawn steel with a ring secured thereto.

It has been attempted to make the windshield of a single piece of drawn steel of a uniform thickness equal to the desired thickness of the threaded base and then to machine out the inside of the windshield to the desired thinness. This latter operation, however, necessitates the use of hook or expanding tools and long cutters and is a difficult, expensive and economically impracticable operation.

It is also known to form a windshield of the desired interior shape and dimensions, upset inwardly and circumferentially the metal of the rear end, cut the screw thread in the upset rear end, and machine the exterior of the windshield from the upset rear and throughout its entire length to the forward end. This operation presents some difficulties in the upsetting operation, while the length of the windshield is such that for large calibre shells its drawing out by the use of existing presses presents difficulties still greater or insurmountable.

The object of the present invention is to make a windshield of light gauge throughout except at its rear end and to make such rear end, upon which the screw thread is cut, integral with the body of the windshield. The invention comprises an improved process of making such a windshield, whereby the mechanical difficulties of prior processes are entirely overcome. In the accompanying drawing.

Figure 1:
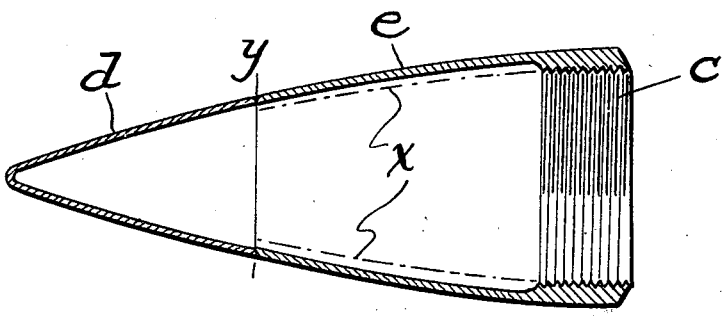
Fig. 1 is a longitudinal sectional view of the completed windshield.
Figure 2:
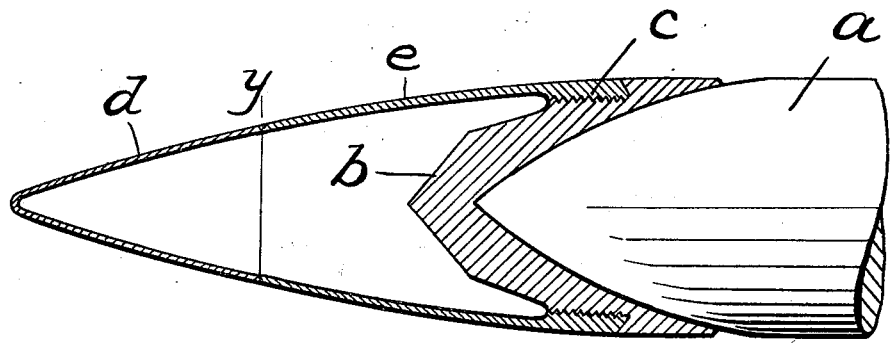
Fig. 2 is a longitudinal sectional view showing the point of a capped shell provided with the windshield of Fig. 1.

A projectile having a body $a$ is provided with a cap $b$ of any desired type, which may be secured to the body in any suitable way. The cap $b$ is reduced in diameter in front of its rear end, to provide a shoulder against which the rear end of the windshield abuts. Said reduced diameter portion of the windshield is provided with an exterior screw thread adapted to be engaged by the interior screw thread on the rear end of the windshield, the interengaging screw threads being shown at $c$.

The windshield is initially made in two separate parts. The front end, or point $d$, of the windshield is made, preferably, of drawn steel, and of the light gauge desired. The rear end, or butt $e$, of the windshield is made, by casting, forging or otherwise, of the thickness required to allow an internal thread of the desired depth to be cut in its rear end. From the rear end of the threaded portion to the front end of the butt the interior of the butt is machined out to reduce the thickness of its wall to the thickness of the wall of the point. The original inner wall of the butt is that indicated by the dotted lines $x$, the final thickness being shown in full lines. The butt and point are then secured together by welding along the circumferential line $y$.

The comparative lengths of the point and butt of the windshield may vary from that shown in the drawing.

Figure 3:
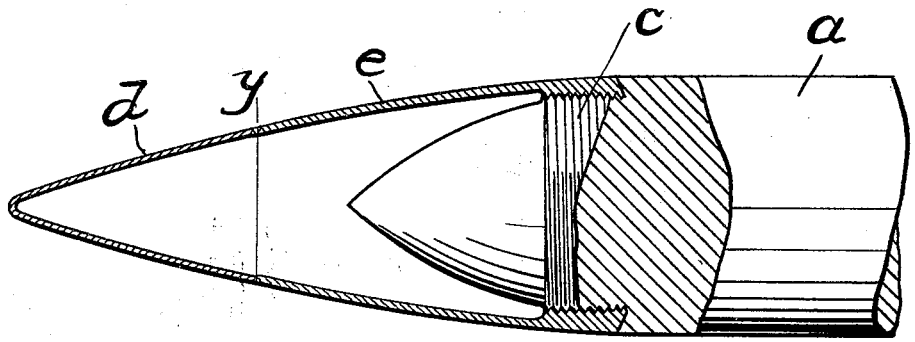
Fig. 3 is a view, similar to Fig. 2, showing the windshield applied direct to the point of the shell.

The windshield may be applied direct to the projectile body, as shown in Fig. 3.

The butt and point may be secured together, less preferably, by means other than welding, as by soldering, brazing or mechanical union.

Having now fully described our invention, what we claim and desire to protect by Letters Patent is:

The process of making a light, thin windshield which comprises forming a windshield in two parts, namely, a point of the light gauge desired and a butt of relatively thick gauge having a forward extremity whose exterior diameter is the same as the exterior diameter of the rear extremity of the point and whose interior diameter is substantially less than the interior diameter of the rear extremity of the point, forming in the butt an internal screw thread which extends from about its rear extremity along a fractional part of the length of the butt, machining out the interior of the butt forward of the screw thread to such light gauge that the interior diameter of its forward extremity will be enlarged to about the interior diameter of the rear extremity of the point, and securing the rear circumferential edge of the point to the front circumferential edge of the butt.

In testimony of which invention, we have hereunto set our hands, at Philadelphia, Pennsylvania, on this 19th day of September 1930.

JOHN L. COX.
BERNARD M. FINE.